Patented Aug. 11, 1931

1,818,778

UNITED STATES PATENT OFFICE

GELLERT ALLEMAN, OF SWARTHMORE, PENNSYLVANIA, ASSIGNOR TO SUN OIL COMPANY, OF PHILADELPHIA, PENNSYLVANIA, A CORPORATION OF NEW JERSEY

PROCESS OF MANUFACTURING COLOR LAKES FROM PETROLEUM

No Drawing. Original application filed August 24, 1926, Serial No. 131,311. Divided and this application filed March 26, 1927. Serial No. 178,820.

The object of my invention is to produce color lakes by the treatment, with water-soluble dyestuffs and water-soluble metal salts, of products derived from crude petroleum.

In order to produce these derivatives, it is first necessary to extract, from the crude petroleum, fatty acid soaps substantially free from mineral oil and also substantially free from, or with a very greatly reduced content of, resinous materials. To do this I start, for example, with the alkali precipitate or soda sludge resulting from the treatment, with caustic soda or other alkali, of acid treated lubricating stock. The composition of this sludge, dependent on the preceding process, is quite variable. A typical composition comprises fatty acid soap, 11.6%; inert material similar to fossil resins 17.1%; sodium sulfate, 2.3%; mineral lubricating oil, 46%; water, 23%.

It is known, as diclosed in the Maitland Patents No. 1,425,882 and No. 1,425,884, to treat the described alkali precipitate or soda sludge so as to eliminate a large part of the water and most of the sodium sulfate and to reduce the percentage of mineral oil. Instead of starting my process with the untreated alkali precipitate, I may start the process with the products of the Maitland patents.

To any composition having the characteristics above described, I add gasoline and also a small amount of lithium sulfate, sodium sulfate or potassium sulfate, or a small amount of lithium chloride, sodium chloride or potassium chloride. An immediate separation takes place of the gasoline and mineral oil, with most of the resins dissolved therein, from the soap, water and a minor proportion of the resins. The sulfates are found to be superior to the chlorides, the double negative charge on the sulfate ion being more effective than the single negative charge on the chloride ion in neutralizing and precipitating the positively charged emulsion particles. Lithium salts are superior to sodium salts, and sodium salts superior to those of potassium. This is a function of surface tension—lithium salts increasing the surface tension more than sodium or potassium salts, and hence tending to break the emulsion more readily. From a commercial standpoint, sodium chloride (common salt), because of its abundance and low cost, seems to be the most desirable substance to effect the separation of the gasoline and oil, with dissolved resins, from the soap, water and a minor proportion of resins. A saturated aqueous solution of the salt is used, being added to the amount of ten per cent. of the total volume. The salt solution may be added before the introduction of the gasoline or it may be added after the gasoline has been distilled into the soap-oil-water emulsion. Instead of using a saturated solution of salt in water, solid sodium chloride (salt) may be added.

It is best to allow the gasoline to enter the crude soap tank, at the bottom, as a vapor. This stirs the mixture, and probably also aids in neutralizing the electrical charges on the suspended colloidal particles. Larger surfaces are exposed to the gasoline, in this manner. Less preferably, the gasoline may be added in liquid form.

The apparatus employed is conveniently arranged as follows: An upright, cylindrical container is employed to hold the oil-soap-water emulsion, which should fill the container to about one-third its capacity. This is conveniently connected to a gasoline still. The bottom of the first mentioned container should be above the level of the gasoline still. Vapors of gasoline are passed through appropriate pipes, from the still, to the bottom of the container holding the soap-oil-water emulsion. A saturated solution of common salt, equivalent in volume to about one-tenth of the soap-oil-gasoline emulsion is added. Gasoline vapor is introduced at the bottom until the container is almost filled by the condensed gasoline. The introduction of gasoline into this container is then discontinued and the mixture allowed to separate. The gasoline-oil layer on top is siphoned back into the gasoline still and the process repeated. After about three extractions, the soap-water solution which remains in the bottom of the container is substantially free of mineral oil, but contains such petroleum resins as may not have been dissolved by the gasoline.

In place of using gasoline in the manner disclosed, I may use any light hydrocarbon, whether derived from petroleum or other sources, such as a benzol distillate from coal tar.

The purified soap contains the original sulfur compounds, wholly or principally sodium sulfate, which were in the crude soap. For certain purposes, these need not be removed. For other purposes, their substantial elimination is desirable and may be necessary. They may be removed by known methods. For example, the soap solution may be concentrated by first evaporating some of the water (to expedite the operation) and then cooling in order to separate the soap from the sodium sulfate, which remains in solution in the water. The separation begins to take place at about 5° C. and is hastened by lower temperatures. The sodium sulfate remains in solution in the water.

The soap may be converted into fatty acids, in any known manner, as, for example, by decomposing the soap with sulfuric, hydrochloric or other mineral acids. These fatty acids have an acid number of about 103.5. (The original crude soap before treatment yields fatty acids having an acid number of 30.)

The fatty acids are now subjected to distillation at an absolute pressure of 4 mm., yielding distillates which are free from resins. Up to a temperature of 180° C. a fraction is obtained having an acid number of 187.06. The next fraction boiling off between 180° and 190° C. has an acid number of 174.4. The next fraction boiling off between 190° and 200° C. has an acid number of 160. The residue, containing most of the resins present before distillation, has an acid number of 61. The distillates contain very little of the resins, the lower boiling distillate being almost or quite free of resin. The last described process is set forth in applications filed by me July 18, 1925, Serial No. 44,629, and August 24, 1926, Serial No. 131,311, of which latter application this application is a division.

To manufacture my improved color lakes, I may utilize the soap produced by the described process, before distillation, which is free of mineral oil and contains only a minor proportion of the original resins; or I may saponify any of the distilled fatty acids and use the soap thereby produced, which soap is also free of mineral oil and contains a still smaller proportion of the original resins or substantially none of the original resins.

To any one of the described soaps I add a water-soluble dyestuff, and then add a water-soluble metal salt to effect an exchange of the metallic ion of the added salt for the metallic ion of the water-soluble soap.

The following is a specific example of the steps of my process following the production of the soap.

A soap free from mineral oil, and also substantially free from the original resins or with a greatly reduced resin content, will have an acid value varying from (say) 103.5 to 187 or over. Assuming (for purposes of calculation) that the anhydrous oil-free soap has an acid value of approximately 160, it will require approximately 159.5 grams of anhydrous calcium chloride to precipitate the sodium in the anhydrous oil-free soap and produce the corresponding calcium derivative. (It will be readily understood that in case the acid value of the anhydrous oil-free soap is lower or higher, a correspondingly smaller or larger amount of calcium chloride will be required.) I take 1 kg. of the anhydrous soap and dissolve it in about 4 litres of water. To this soap solution is added 15 gms., more or less, lithosol rubine B powder. Alternatively, the dyestuff may be dissolved in water and added to the anhydrous oil-free soap. 160 gms. of anhydrous calcium chloride is dissolved in about 500 cc. of water. It is decidedly advantageous, although unnecessary, to add the calcium chloride solution gradually, while stirring the soap solution. The calcium derivative of the soap separates out as an extremely sticky, tenacious red-colored mass. The dyestuff is adsorbed by the calcium derivative, thus forming a color lake insoluble in water; or some chemical reaction, the nature of which is not understood, takes place between the dyestuff and the calcium derivative. The sticky mass, which flows at a temperature of about 60° F., is next washed with cold water, during which process it is agitated by means of a mechanical stirrer or by means of air. The mechanical stirrer seems to be more desirable for this purpose, as fine fibres of the calcium derivative are pulled through the water, thus gaining greater surface for washing. After washing with water, it may be partly dried by the application of heat.

In place of the dyestuff mentioned, any other water-soluble dyestuff may be used, dependent on the color desired.

In place of calcium chloride, I may use another water-soluble salt of calcium, or any other water-soluble metallic salt capable of forming an insoluble compound with the material to be precipitated, as, for example, salts of barium, zinc, lead, manganese, copper, chromium, cobalt, nickel, aluminum and magnesium. Color lakes made with salts of barium and calcium give better colors and give more desirable physical properties to the color lakes than most, or possibly all, other salts. As is well understood, when using certain dyestuffs, the precipitates with certain salts are of one color and those with another salt are another color.

The novelty of the process and of the color lakes themselves does not depend on any novelty in the method of adding the dyestuff and the water-soluble metal salt, the novelty of the process and product depending on the production from petroleum of a fatty acid soap from which the mineral oil has been substantially eliminated and from which, also, a large proportion of the petroleum resins have been eliminated.

The color lakes made from such oil-free soaps derived from petroleum have certain pronounced advantages over color lakes made from soaps of other origin.

A color lake made with the use of a calcium salt or a barium salt, while insoluble in water, is soluble or miscible in ethyl acetate, carbon tetrachloride, gasoline, benzene and ether. Unless heated, it does not dry on exposure to the air, but remains sticky. When mixed with calcium carbonate, it forms a non-drying, non-hardening, pasty-like mass which sticks to glass, wood or iron with great tenacity. It is non-brittle and accommodates itself without cracking to the differences in volume due to contraction by cold and expansion by heat.

While these color lakes are adapted to manifold uses, they are especially valuable in the manufacture of varnishes, paints and printing, lithographing, and wall paper inks.

It will be understood that the proportion of dyestuff will vary with the strength of the dye and the intensity of the color desired and that the proportion of the metal salt will vary with the particular metal salt that is used as well as with the acid value of the soap. For example, if barium chloride is the salt used, and if the oil-free soap used has an acid value of 160, it will require 351 gms. of barium chloride to one kg. of the soap.

While, in my preferred process, I prefer to eliminate the mineral oil and, in whole or in large part, the petroleum resins, by means of the process herein described, I have claimed that process per se in my Patent 1,694,461, dated December 11, 1928, and do not herein limit my invention to that process, except in the claim or claims wherein it is specifically recited. The separation of the soap from the oil and resins is merely the first step of my complete process and may be effected in any way, now known or hereafter discovered, preparatory to carrying out those steps of my complete process whereby my new products are produced.

Where, in the claims, I refer to materially reducing the content of resins, I mean to include the reduction of the resin content to any degree, including its substantial elimination, where such elimination can be effected by the distillation described, or otherwise.

Having now fully described my invention, what I claim and desire to protect by Letters Patent is:

1. The process of manufacturing color lakes from petroleum which consists in producing a water-soluble soap by a treatment comprising substantially completely eliminating the mineral oil from, and substantially reducing the content of petroleum resins in, a petroleum-derived product containing soap, mineral oil and petroleum resins and adding to said soap a water-soluble dyestuff and a water solution of a water-soluble metal salt adapted to combine with the acid radical to form a water-insoluble soap.

2. The process of manufacturing color lakes from petroleum which consists in producing a water-soluble soap by a treatment comprising obtaining from petroleum a composition containing a water-soluble soap and resinous material having characteristics of the precipitate resulting from the treatment with an alkali of acid-treated mineral oil, but free from mineral oil and with a substantially reduced content of petroleum resins, and adding to said soap a water-soluble dyestuff and a water solution of a water-soluble metal salt adapted to combine with the acid radical to form a water-insoluble soap.

3. The process of manufacturing color lakes from petroleum which consists in producing a water-soluble soap by a treatment comprising substantially eliminating, from an emulsion of soap derived from mineral oil, mineral oil and petroleum resins, the mineral oil and so far reducing the content of resinous material that the water-soluble fatty acid soap if decomposed to an acid will have an acid number not less than about 100, and adding thereto a water-soluble dyestuff and a water solution of a water-soluble metal salt adapted to combine with the acid radical to form a water-insoluble soap.

4. The process of manufacturing color lakes from petroleum which consists in producing a water-soluble soap by a treatment comprising substantially eliminating, from an emulsion of soap derived from mineral oil, mineral oil and petroleum resins, the mineral oil and so far reducing the content of resinous material that the water-soluble fatty acid soap if decomposed to an acid will have an acid number not substantially less than about 160, and adding thereto a water-soluble dyestuff and a water solution of a water-soluble metal salt adapted to combine with the acid radical to form a water-insoluble soap.

5. The process of manufacturing color lakes from a water-soluble soap derived from petroleum and resinous material containing mineral oil emulsified therewith, which consists in producing a water-soluble soap by a treatment comprising adding thereto a water-soluble de-emulsifiable salt and passing thereinto and therethrough gasoline vapors, the gasoline dissolving the oil and some of the resins, and separating the gasoline-oil-resin solution, and adding to the said water-soluble soap a water-soluble dyestuff and a water solution of a water-soluble metal salt adapted to combine with the acid radical to form a water-insoluble soap.

6. The process of manufacturing color lakes from a water-soluble soap derived from petroleum and resinous material containing mineral oil emulsified therewith, which comprises adding thereto a water-soluble de-emulsifiable salt and passing thereinto and therethrough gasoline vapors and condensing the gasoline, the gasoline dissolving the oil and some of the resins, separating the gasoline solution from the soap, converting the soap into fatty acids, separating the fatty acids from resins that have not been dissolved by the gasoline, saponifying the fatty acids to produce a water-soluble soap substantially free from mineral oil and more or less free from resinous materials, and adding to the water-soluble soap a water-soluble dyestuff and a water solution of a water-soluble metal salt adapted to combine with the acid radical to form a water-insoluble soap.

7. The process of manufacturing color lakes which comprises adding to a water-soluble soap derived from petroleum a water-soluble dyestuff and a water-solution of a water-soluble metal salt adapted to combine with the acid radical to form a water-insoluble soap, said water-insoluble soap being distinguished from the emulsion of soap, mineral oil and petroleum resins produced by treating mineral lubricating oil successively with a mineral acid and an alkali by the fact that it is substantially devoid of mineral oil and that it has a substantially reduced content of petroleum resins.

8. The process of manufacturing color lakes which comprises adding, to a soap derived from petroleum and from which mineral oil has been substantially completely, and petroleum resins at least largely, eliminated, a water-soluble dyestuff and a water solution of a water-soluble metal salt adapted to precipitate said soap.

9. A color lake comprising the reaction products, in aqueous solution, of a salt of a metal, a dyestuff, and a water-soluble soap produced by successive treatments of a mineral lubricating oil stock with sulphuric acid and an alkali followed by the purification of the soap by substantially complete removal of oil and a substantial reduction of the content of resins, the salt being of a metal which combines with the acid radical of the soap to form a water-insoluble product; said color lake being insoluble in water, soluble in ethyl acetate, carbon tetrachloride, gasoline, benzine and ether, and on exposure to air substantially non-drying and non-brittle.

10. A color lake comprising the reaction products, in aqueous solution, of a salt of a metal, a dyestuff, and a water-soluble soap produced by successive treatments of a mineral lubricating oil stock with an acid and an alkali followed by the purification of the soap by substantially complete removal of oil and a substantial reduction of the content of resins, the salt being of a metal which combines with the acid radical of the soap to form a water-insoluble product; said color lake being insoluble in water, soluble in ethyl acetate, carbon tetrachloride, gasoline, benzine and ether, and on exposure to air substantially non-drying and non-brittle.

11. A color lake comprising the reaction products in aqueous solution, of a salt of a metal, a dyestuff, and a water-soluble soap produced by successive treatments of petroleum with sulphuric acid and an alkali followed by the purification of the soap by substantially complete removal of oil and a substantial reduction of the content of resins, the salt being of a metal which combines with the acid radical of the soap to form a water-insoluble product; said color lake being insoluble in water, soluble in ethyl acetate, carbon tetrachloride, gasoline, benzine and ether, and on exposure to air substantially non-drying and non-brittle.

12. A color lake comprising the reaction products, in aqueous solution, of a salt of a metal, a dyestuff, and a water-soluble soap produced by successive treatments of petroleum with an acid and an alkali followed by the purification of the soap by substantially complete removal of oil and a substantial reduction of the content of resins, the salt being of a metal which combines with the acid radical of the soap to form a water-insoluble product; said color lake being insoluble in water, soluble in ethyl acetate, carbon tetrachloride, gasoline, benzine and ether, and on exposure to air substantially non-drying and non-brittle.

13. The process of manufacturing color lakes which includes causing to react, in aqueous solution, a salt of a metal, a dyestuff, and a water soluble soap produced by successive treatments of a mineral lubricating oil stock with sulphuric acid and an alkali followed by the purification of the soap by substantially complete removal of the oil and a substantial reduction of the content of resins, the salt being of a metal which combines with the acid radical of the soap to form a water-insoluble product.

14. The process of manufacturing color lakes which includes causing to react, in aqueous solution, a salt of a metal, a dyestuff, and a water soluble soap produced by successive treatments of a mineral lubricating oil stock with an acid and an alkali followed by the purification of the soap by substantially complete removal of the oil and a substantial reduction of the content of resins, the salt being of a metal which combines with the acid radical of the soap to form a water-insoluble product.

15. The process of manufacturing color lakes which includes causing to react, in aqueous solution, a salt of a metal, a dyestuff, and a water soluble soap produced by successive treatments of petroleum with sulphuric acid and an alkali followed by the purification of the soap by substantially complete removal of the oil and a substantial reduction of the content of resins, the salt being of a metal which combines with the acid radical of the soap to form a water-insoluble product.

16. The process of manufacturing color lakes which includes causing to react, in aqueous solution, a salt of a metal, a dyestuff, and a water soluble soap produced by successive treatments of petroleum with an acid and an alkali followed by the purification of the soap by substantially complete removal of the oil and a substantial reduction of the content of resins, the salt being of a metal which combines with the acid radical of the soap to form a water-insoluble product.

17. The process of manufacturing color lakes which comprises adding, to an emulsion of a water-soluble fatty acid soap derived from petroleum and substantially devoid of petroleum resins, a water soluble dyestuff and an aqueous solution of a water-soluble metal salt adapted to precipitate said soap.

18. The process of manufacturing color lakes which comprises adding, to a water-soluble fatty acid soap derived from petroleum and containing a substantially reduced content of resin, a water-soluble dyestuff and an aqueous solution of a water-soluble metal salt adapted to precipitate said soap.

19. The process of manufacturing color lakes which comprises adding to a water-soluble fatty acid soap derived from petroleum a water-soluble dyestuff and an aqueous solution of a water-soluble metal salt adapted to precipitate said soap, said soap being distinguished from the emulsion of soap, mineral oil and petroleum resins produced by treating mineral oil successively with a mineral acid and an alkali by the fact that it is substantially devoid of mineral oil and has a substantially reduced content of resins.

20. The process of manufacturing color lakes which comprises adding to an emulsion of a water-soluble fatty acid soap derived from petroleum a water-soluble dyestuff and an aqueous solution of a water-soluble metal salt adapted to precipitate said soap, said emulsion being distinguished from the emulsion of soap, mineral oil and petroleum resins produced by treating mineral lubricating oil successively with a mineral acid and an alkali by the fact that it is substantially devoid of mineral oil and has a substantially reduced content of resin.

21. A color lake comprising the reaction products of a water-soluble fatty acid soap derived from petroleum and having a substantially reduced content of resin, a water-soluble soap precipitating metal salt, and a water-soluble dyestuff.

22. A color lake comprising the reaction products of a water soluble fatty acid soap derived from petroleum and petroleum resins and having a substantially reduced content of resin, a water-soluble soap precipitating metal salt, and a water-soluble dyestuff.

23. A color lake comprising the reaction products of a water-soluble soap precipitating metal salt, a water-soluble dyestuff, and a water-soluble fatty acid soap derived from petroleum, said soap being distinguished from the emulsion of soap, mineral oil and petroleum resins produced by treating mineral lubricating oil successively with a mineral acid and an alkali by the fact that it is substantially devoid of mineral oil and has a substantially reduced content of resin.

24. A color lake comprising the reaction products of a water-soluble soap precipitating metal salt, a water-soluble dyestuff and an emulsion of a water-soluble fatty acid soap derived from petroleum and the petroleum resins, said emulsion being distinguished from the emulsion of soap, mineral oil and petroleum resins produced by treating mineral lubricating oil successively with a mineral acid and an alkali by the fact that it is substantially devoid of mineral oil and has a substantially reduced content of resin.

In testimony of which invention, I have hereunto set my hand at Swarthmore, Pennsylvania, on this 18th day of March, 1927.

GELLERT ALLEMAN.